United States Patent
Hirano et al.

(10) Patent No.: US 12,502,727 B2
(45) Date of Patent: Dec. 23, 2025

(54) CORROSION AND WEAR RESISTANT OVERLAY, METHOD FOR FORMING CORROSION AND WEAR RESISTANT OVERLAY, AND CORROSION AND WEAR RESISTANT VALVE

(71) Applicant: Hitachi-GE Nuclear Energy, Ltd., Hitachi (JP)

(72) Inventors: Sei Hirano, Ibaraki (JP); Yoshihisa Kiyotoki, Ibaraki (JP); Hajime Miyata, Ibaraki (JP); Hirotsugu Kawanaka, Tokyo (JP); Shinji Matsushita, Tokyo (JP); Hiroshi Shiratori, Tokyo (JP)

(73) Assignee: Hitachi-GE Nuclear Energy, Ltd., Hitachi (JP)

( * ) Notice: Subject to any disclaimer, the term of this patent is extended or adjusted under 35 U.S.C. 154(b) by 731 days.

(21) Appl. No.: 17/363,826

(22) Filed: Jun. 30, 2021

(65) Prior Publication Data
US 2021/0323085 A1    Oct. 21, 2021

Related U.S. Application Data

(62) Division of application No. 16/228,923, filed on Dec. 21, 2018, now abandoned.

(30) Foreign Application Priority Data

Dec. 26, 2017   (JP)  ................................ 2017-250255

(51) Int. Cl.
    *B23K 20/12*      (2006.01)
    *B22F 3/115*      (2006.01)
    (Continued)

(52) U.S. Cl.
    CPC .......... *B23K 20/1275* (2013.01); *B22F 3/115* (2013.01); *B23K 26/342* (2015.10);
    (Continued)

(58) Field of Classification Search
CPC ... B23K 20/1275; B23K 26/34; B23K 26/342
See application file for complete search history.

(56) References Cited

U.S. PATENT DOCUMENTS 4,930,675 A *   6/1990   Bedford ............... B23K 35/327
                                                          228/114.5
6,672,330 B2 *   1/2004   Chigasaki ................ F16K 3/12
                                                           148/648

(Continued)

FOREIGN PATENT DOCUMENTS

AT              402 301         4/1997
CN      101893426 A   *   11/2010
(Continued)

OTHER PUBLICATIONS

D'Oliveria A., etc al.; "Microstructural features of consecutive laser of Stellite 6 deposited by laser cladding"; "Surface and Coating Technology", vol. 153, 2002, p. 203-209 (Year: 2002).*

(Continued)

*Primary Examiner* — Sally A Merkling
*Assistant Examiner* — Austin Pollock
(74) *Attorney, Agent, or Firm* — Crowell & Moring LLP

(57) ABSTRACT

Intended is to improve the corrosion resistance of an overlay used in a nuclear power plant, and to reduce dissolution of cobalt from an overlay. The corrosion and wear resistant overlay 7 is formed along a surface of a base 2 by laser lamination modeling, and is configured from a plurality of metal layers 1a, 1b, 1c, and 1d of a Co-base alloy. The thickness of carbide eutectics that precipitate in the metal layers 1a, 1b, 1c, and 1d is the largest in the metal layer 1a closest to the base 2, and is gradually smaller in the metal layers 1b, 1c, and 1d farther away from the base 2. The intensity of the laser beam applied to form layers by laser lamination modeling is adjusted so that the carbide eutectics (Continued)

that precipitate in at least the outermost metal layer 1d have a controlled size of 10 μm or less.

3 Claims, 3 Drawing Sheets

(51) Int. Cl.
*B22F 7/04* (2006.01)
*B23K 26/342* (2014.01)
*B23K 101/34* (2006.01)
*B23K 103/04* (2006.01)
*B23K 103/18* (2006.01)
*B23P 15/00* (2006.01)
*C22C 1/04* (2023.01)
*C22C 19/07* (2006.01)
*C22F 1/10* (2006.01)
*C23C 24/10* (2006.01)
*C23C 28/02* (2006.01)
*F01L 3/02* (2006.01)
*F01L 3/08* (2006.01)
*F16K 3/02* (2006.01)
*F16K 3/12* (2006.01)
*F16K 15/02* (2006.01)
*F16K 25/00* (2006.01)
*G21C 17/022* (2006.01)
*G21D 1/02* (2006.01)

(52) U.S. Cl.
CPC ............ *C22C 1/0433* (2013.01); *C22C 19/07* (2013.01); *C22F 1/10* (2013.01); *C23C 24/10* (2013.01); *C23C 24/106* (2013.01); *C23C 28/021* (2013.01); *F01L 3/02* (2013.01); *F01L 3/08* (2013.01); *F16K 3/0263* (2013.01); *F16K 3/12* (2013.01); *F16K 15/021* (2013.01); *F16K 25/00* (2013.01); *F16K 25/005* (2013.01); *G21C 17/0225* (2013.01); *G21D 1/02* (2013.01); *B22F 2007/042* (2013.01); *B23K 2101/34* (2018.08); *B23K 2103/05* (2018.08); *B23K 2103/26* (2018.08); *B23P 15/001* (2013.01); *C21D 2251/04* (2013.01); *C21D 2261/00* (2013.01); *F01L 2301/00* (2020.05)

(56) References Cited

U.S. PATENT DOCUMENTS

| | | | |
|---|---|---|---|
| 2011/0278490 A1 | 11/2011 | Maruno et al. | |
| 2013/0149552 A1 | 6/2013 | Yao et al. | |
| 2014/0220380 A1* | 8/2014 | Sarabanda | C23C 24/103 428/656 |
| 2014/0284509 A1* | 9/2014 | Shindo | F16K 1/32 251/324 |

FOREIGN PATENT DOCUMENTS

| | | | | |
|---|---|---|---|---|
| CN | 101797643 B | | 8/2011 | |
| CN | 104619455 A | * | 5/2015 | ........... B23K 26/082 |
| CN | 104962908 A | * | 10/2015 | |
| JP | 02080188 A | * | 3/1990 | ............ B23K 26/32 |
| JP | 5-156396 A | | 6/1993 | |
| JP | 10030139 A | * | 2/1998 | |
| JP | 2001281394 A | * | 10/2001 | |
| JP | 2005194602 A | * | 7/2005 | |
| JP | 2011-214682 A | | 10/2011 | |

OTHER PUBLICATIONS

Jendrzejewski R., et al.; "Temperature Distribution in laser-clad multi-layers"; Materials Science and Engineering; 379, p. 313-320, 2004 (Year: 2004).*

Mingxi L., et al.; "Microstructure and wear resistance of laser clad cobalt-based alloy multi-layer coatings"; Applied Surface Science, 230, p. 201-206, 2004 (Year: 2004).*

Sun S.; et al.; "Parametric investigation of pulsed Nd:YAG laser cladding of stellite 6 on stainless steel"; Surface & Coating Technology, 194, p. 225-231, 2005 (Year: 2005).*

Manvatkar V., et al; "Heat transfer and material flow during laser assisted multi-layer additive manufacturing"; J. of Applied Physics; 116, 124905, 2014 (Year: 2014).*

Zhu G.; "Numerical Simulation of thermal behavior during laser direct metal deposition"; Int J Adv Manufacturing Tech.; 55, 945-954; 2011 (Year: 2011).*

Otterloo J.L., et al.; "Microstructural Features and Mechanical Properties of a Cobalt-Based Laser Coating"; Acta mater. vol 45, No. 3., pp. 1225-1236 (Year: 1997).*

Hosson J. Th., et al.; "Surface engineering with laser of co-base materials", Transactions on Engineering Sciences, vol. 17, 1997 (Year: 1997).*

Extended European Search Report issued in counterpart European Application No. 182150952.0 dated May 28, 2019 (11 pages).

D'Oliveira et al., "Microstructural Features of Consecutive Layers of Satellite 6 Deposited by Laser Cladding", Surface and Coatings Technology, 2002, pp. 203-209, vol. 153, XP55228680, (four (4) pages).

Jendrzejewski et al., "Temperature Distribution in Laser-Clad Multi-Layers", Materials Science and Engineering A, 2004, pp. 313-320, vol. 379, XP055519922, (four (4) pages).

Yadroitsev I. et al., "Application of laser assisted technologies for fabrication of functionally graded coatings and objects for the International Thermonuclear Experimental Reactor components", ScienceDirect, Journal of Nuclear Materials, Jan. 26, 2007, pp. 189-196, vol. 362, No. 2, XP029224894 (eight (8) pages).

European Office Action issued in European Application No. 18215092.0 dated Apr. 1, 2022 (nine (9) pages).

* cited by examiner

CORROSION AND WEAR RESISTANT OVERLAY, METHOD FOR FORMING CORROSION AND WEAR RESISTANT OVERLAY, AND CORROSION AND WEAR RESISTANT VALVE

This application is a divisional of U.S. patent application Ser. No. 16/228,923 filed Dec. 21, 2018, which claims priority from Japanese Patent Application No. 2017-250255, filed on Dec. 26, 2017, the disclosures of which are expressly incorporated by reference herein.

TECHNICAL FIELD

The present invention relates to a corrosion and wear resistant overlay formed on a surface of a base such as steel, and to a method for forming such a corrosion and wear resistant overlay, and to a corrosion and wear resistant valve.

BACKGROUND ART

For their desirable heat resistance and wear resistance, Co-base alloy overlays are often used for sliding parts (e.g., a valve seat) of a gate valve (a valve) of piping in applications such as a nuclear power plant. However, a Co-base alloy such as a valve seat is known to release cobalt into the flowing fluid in a pipe. The cobalt dissolved into the fluid enters the reactor core unit, and generates radioisotope cobalt-60 ($^{60}Co$) by reacting with neutrons. In addition to circulating in the pipes of a nuclear power plant, cobalt-60 adheres to inner walls of the pipes, and because $^{60}Co$ is a γ radiation source, this radioactive isotope represents a risk factor of exposure for people working near the pipes. To reduce such exposure of workers to $^{60}Co$, there is a need to reduce dissolution of cobalt from areas where Co-base alloys are used, for example, such as a valve seat.

The cause of cobalt dissolution from a Co-base alloy in a sliding part such as a valve seat is the corrosion and exfoliation of a Co-base alloy surface, which proceeds, though slowly, under the strong pressure and shear force of sliding on a surface. A known cause of such corrosion and exfoliation involves the carbide eutectic that precipitates in a Co-base alloy.

Crystals of Co-base alloys such as Stellite® typically have a so-called dendrite structure (a branching or fernlike structure), and precipitation of a carbide eutectic often occurs at the crystal boundaries of the dendrite structure. Accordingly, many of the carbide eutectics appear branching or fernlike. Here, the adhesion between the structural part of the dendrite and the carbide eutectic decreases as the Cr concentration decreases at the boundaries between these two domains of a Co-base alloy. This makes the carbide eutectic domain to easily separate from the structural part of the dendrite when the Co-base alloy is subjected to strong external pressure and shear force. In such a Co-base alloy, corrosion progressively occurs from the surface side along the branching or fernlike carbide eutectic, before the structural part of dendrite exfoliates.

As an example of related art, PTL 1 discloses a technique whereby a surface portion of a Co-base alloy is subjected to a friction stir treatment to alter the branching or fernlike carbide eutectic on the surface to a granular or a clump shape to reduce surface corrosion and exfoliation. More specifically, in the technique disclosed in PTL 1, the branching or fernlike carbide eutectic—which often extends from surface to inside of a Co-base alloy upon its formation—is cut into a granular or clump shape in a friction stir treatment. According to PTL 1, this stops the chain reaction of corrosion in the carbide eutectic, and reduces the progression of the corrosion and detachment to the structural part of the dendrite in a Co-base alloy.

CITATION LIST

Patent Literature

PTL 1: JP-A-2011-214682

SUMMARY OF INVENTION

Technical Problem

In the technique described in PTL 1, the surface of a Co-base alloy overlay formed by a common technique such as arc welding is altered by friction stir treatment to improve corrosion resistance. However, further improvement is needed if the technique were to be used in a severe environment such as in a nuclear power plant.

It is accordingly an object of the present invention to provide a corrosion and wear resistant overlay capable of improving corrosion resistance and reducing dissolution of cobalt in a severe environment such as in a nuclear power plant. The invention is also intended to provide a method for forming such a corrosion and wear resistant overlay, and a corrosion and wear resistant valve.

Solution to Problem

A corrosion and wear resistant overlay according to the present invention includes a plurality of Co-base alloy layers formed along a surface of a base. A carbide eutectic that precipitates at a boundary between crystals of a dendrite structure of the Co-base alloy in the plurality of layers has an average thickness that is thicker in layers closer to the base, or thinner in layers farther away from the base.

The carbide eutectic that precipitates in at least the outermost layer of the plurality of layers has a maximum thickness of about 10 μm or less.

Advantageous Effects of Invention

The present invention has made it possible to provide a corrosion and wear resistant overlay capable of improving corrosion resistance and reducing dissolution of cobalt in a severe environment such as in a nuclear power plant. The invention has also provided a method for forming such a corrosion and wear resistant overlay, and a corrosion and wear resistant valve.

DESCRIPTION OF EMBODIMENTS

Figure 1:
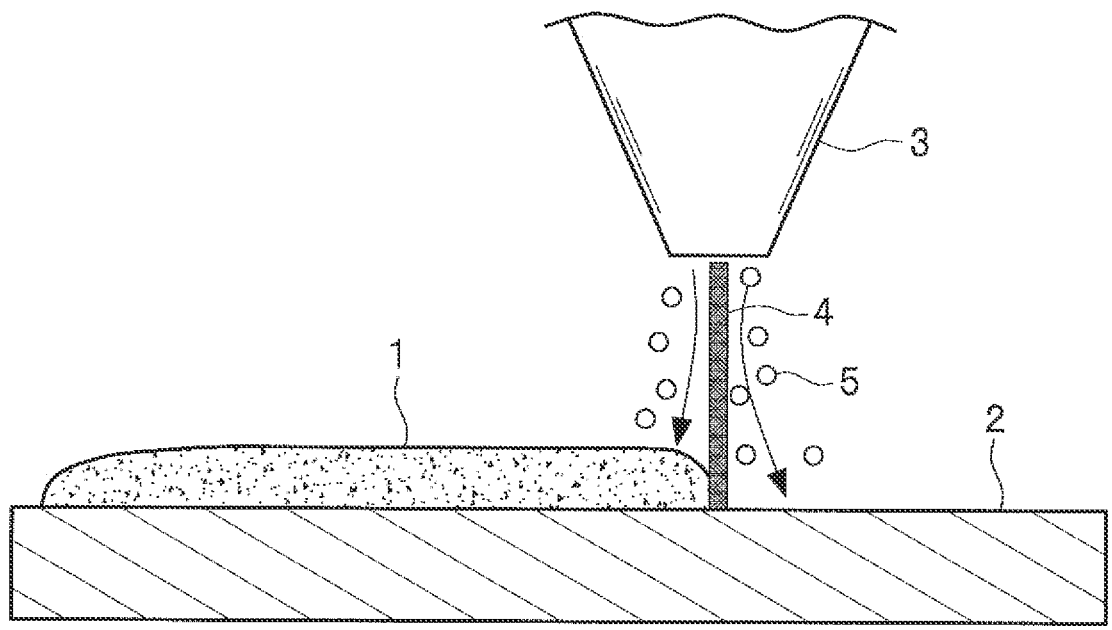
FIG. 1 is a diagram schematically representing the principle of metal layer formation by laser lamination modeling.

Embodiments of the present invention are described below in detail, with reference to the accompanying drawings. In the drawings, the same reference numerals are used to refer to the same constituting elements, and descriptions of such common members will not be repeated.

First Embodiment

FIG. 1 is a diagram schematically representing the principle of metal layer formation by laser lamination modeling. Laser lamination modeling is a type of modeling techniques used in 3D printers. The present embodiment applies laser lamination modeling to formation of an overlay. As shown in FIG. 1, in the laser lamination modeling of the embodiment, a metal powder 5 discharged through a nozzle 3 is melted with a laser beam 4 to deposit on a surface of a base 2 formed of material such as a carbon steel and a stainless steel, and form a metal layer 1 on the base surface. In the present embodiment, the material of the powder 5 is, for example, a Co-base alloy such as Stellite®. Accordingly, the metal layer 1 formed in the present embodiment is a Co-base alloy layer.

In the laser lamination modeling described above, the metal layer 1 formed on the base 2 is present only in a spot bombarded with the powder 5 through the nozzle 3 and irradiated with the laser beam 4. Accordingly, when the meal layer 1 is to be formed over a region wider than the spot of the laser beam 4, the powder 5 discharged through the nozzle 3 is melted by the laser beam 4 to deposit while moving the spot of the nozzle 3 and the laser beam 4 over the whole region.

The thickness of the metal layer 1 formed in the manner described above can be adjusted by controlling, for example, the discharge amount of metal powder 5 through the nozzle 3, and the moving speed of the nozzle 3. The temperature at which the powder 5 melts to deposit can be adjusted by controlling, for example, the intensity of the laser beam 4.

Figure 2:
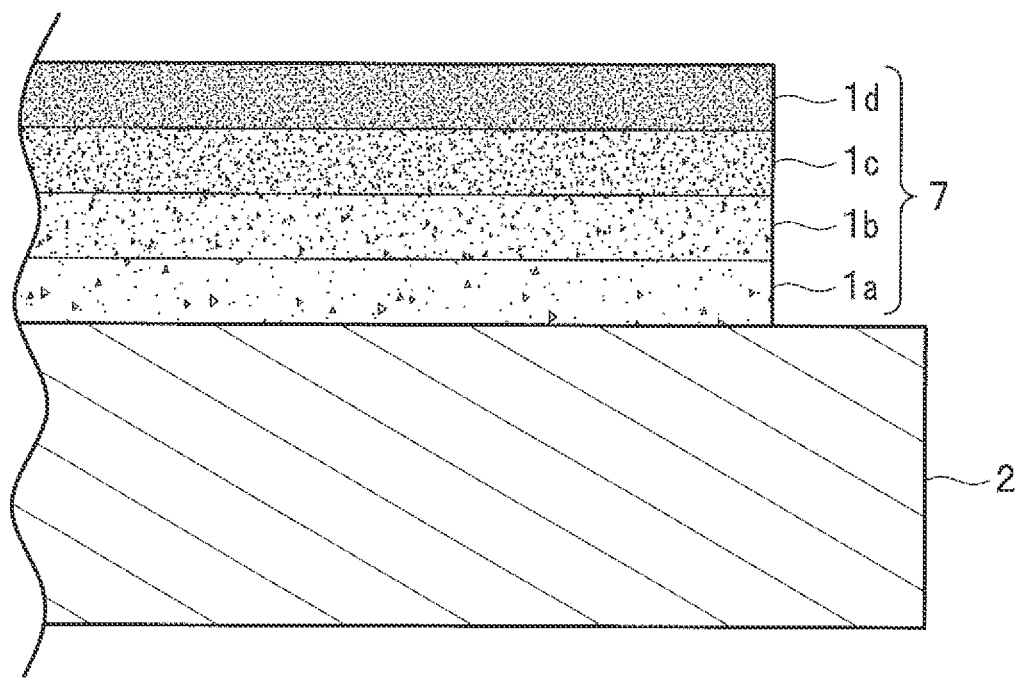
FIG. 2 is a diagram representing an example of a cross sectional structure of a corrosion and wear resistant overlay according to First Embodiment of the present invention.

FIG. 2 is a diagram representing an example of a cross sectional structure of a corrosion and wear resistant overlay 7 according to First Embodiment of the present invention. As illustrated in FIG. 2, the corrosion and wear resistant overlay 7 according to the present embodiment is configured from a plurality of metal layers 1a, 1b, 1c, and 1d. The plurality of metal layers 1a, 1b, 1c, and 1d are formed by the laser lamination modeling described with reference to FIG. 1. Specifically, in the present embodiment, the metal layer 1a is formed on a surface of the base 2 by laser lamination modeling, and the metal layers 1b, 1c, and 1d are formed in succession on the underlying metal layers 1a, 1b, and 1c, respectively.

Here, the base 2 is a carbon steel or a stainless steel, and the material of the metal layers 1a, 1b, 1c, and 1d is a Co-base alloy such as Stellite®. Accordingly, the powder 5 discharged through the nozzle 3 for the formation of the metal layers 1a, 1b, 1c, and 1d is of the same Co-base alloy. In the present embodiment, the laser beam 4 applied to the powder 5 in forming the metal layers 1a, 1b, 1c, and 1d has preset intensities that are higher for layers closer to the base 2, or lower for layers farther away from the base 2. That is, the laser beam 4 has the highest preset intensity for the metal layer 1a, and the lowest preset intensity for the metal layer 1d.

Figure 3A:
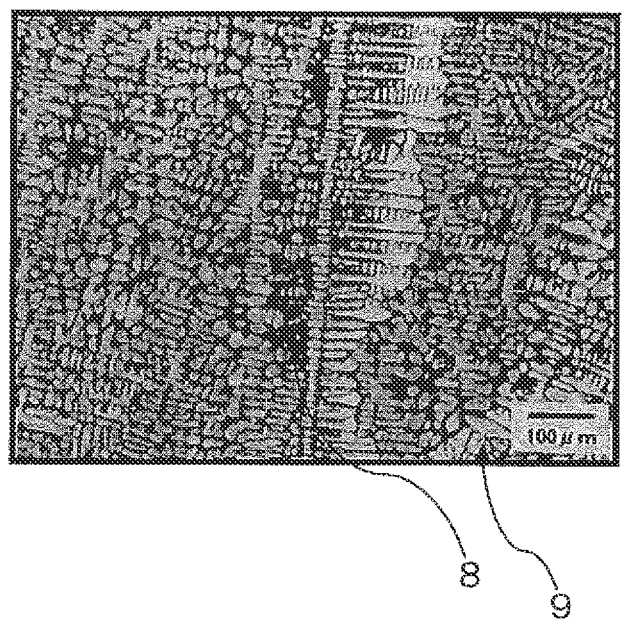
FIG. 3A is an example of a micrograph taken for a surface of an overlay formed by related art.

In a Co-base alloy overlay formed by a traditional method such as arc welding, the Co-base alloy forms branching or fernlike crystals of dendrites 9 as shown in FIG. 3(a) (described later) because of a sufficient amount of heat and slow cooling. Carbide eutectics 8 of an interconnected branching structure precipitate at the boundaries between the dendrites 9.

In the present embodiment, the laser beam 4 that melts the powder 5 to deposit and form the metal layers 1a, 1b, 1c, and 1d is applied in spots (localized application). Accordingly, the deposit formed after heating and melting by the laser beam 4 rapidly cools. This inhibits formation of large crystals of dendrites 9 in the metal layers 1a, 1b, 1c, and 1d. There accordingly will be no precipitation of a large carbide eutectic 8 at the boundaries between the dendrites 9. That is, in the present embodiment, the carbide eutectic 8 that occurs in the Co-base alloy can be reduced in size.

In the present embodiment, the laser beam 4 has preset intensities that are higher for layers closer to the base 2, or lower for layers farther away from the base 2. That is, the heat input to the metal layers 1a, 1b, 1c, and 1d is the largest for the metal layer 1a contacting the base 2, and becomes gradually smaller for the metal layers 1b, 1c, and 1d away from the base 2. The average size of carbide eutectic 8 occurring in the metal layers 1a, 1b, 1c, and 1d is therefore larger in layers closer to the base 2, or smaller in layers farther away from the base 2.

FIG. 3, (a) is an example of a micrograph taken for a surface of an overlay formed by related art, (b) is an example of a micrograph taken for a surface of a corrosion and wear resistant overlay formed by using the technique of the present embodiment, and (c) is a diagram magnifying a portion of the micrograph shown in (b). Here, "related art" means arc welding.

As can be seen in the micrograph shown in FIG. 3(a), the overlay of related art has crystals of dendrites 9 (appearing white in the picture) of a size as small as several tens of micrometers and exceeding one-hundred micrometers. It can also be seen that a carbide eutectic 8 larger than 100 μm (appearing black in the picture) has precipitated at the crystal boundaries of dendrites 9. When tested with an ultrasonic flaw detector capable of detecting a flaw as small as about 100 μm, the overlay of the related art has large numbers of detectable flaws. This means that the overlay of related art includes large numbers of carbide eutectics 8 larger than about 100 μm.

Figure 3B:
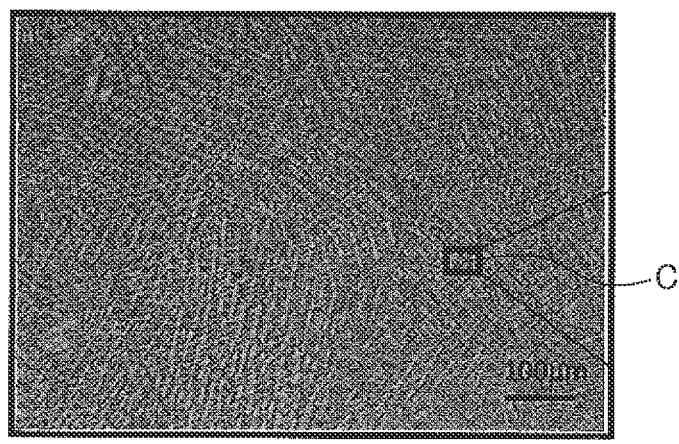
FIG. 3B is an example of a micrograph taken for a surface of a corrosion and wear resistant overlay formed by using the technique of the present embodiment.
Figure 3C:
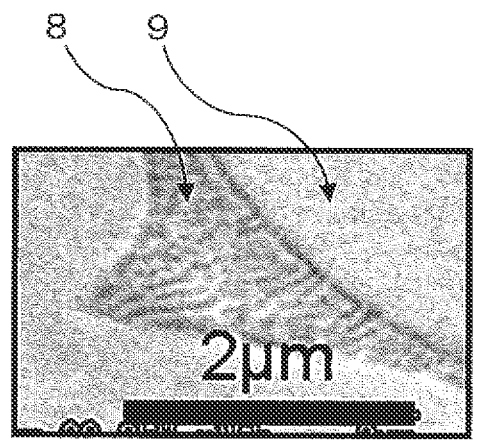
FIG. 3C is a diagram magnifying a portion C of the micrograph shown in FIG. 3B.

In contrast, as shown in the micrographs of FIGS. 3(b) and 3(c), the crystal size of dendrites 9 themselves is small in the corrosion and wear resistant overlay 7 formed by using the technique of the present embodiment. The carbide eutectic 8 precipitated at the crystal boundaries of the dendrites 9 is only about several micrometers at most, and not many carbide eutectics are observable. When tested with a common ultrasonic flaw detector such as above, the corrosion and wear resistant overlay 7 formed by using the technique of the present embodiment involves hardly any detectable defect that can be called a flaw. This means that the corrosion and wear resistant overlay 7 formed by using the technique of the present embodiment does not include a carbide eutectic 8 larger than about 100 μm.

As described above, in the present embodiment, the size of carbide eutectic 8 can be reduced to smaller than about 10 μm. In terms of size reduction of carbide eutectic 8, it can be said that the effect is sufficiently larger than that of the technique of PTL 1 achieving a carbide eutectic size of 100 µm or less.

As described above, in the corrosion and wear resistant overlay 7 according to the present embodiment, the carbide eutectic 8 in at least a surface portion can have a maximum size of 10 µm or less. In the corrosion and wear resistant overlay 7 of a Co-base alloy, corrosion progressively occurs as the carbide eutectic 8 detaches itself and exfoliates from the dendrites 9, as described above.

That is, in the corrosion and wear resistant overlay 7 of the present embodiment, corrosion occurring in some of the carbide eutectics 8 and causing exfoliation of these carbide eutectics 8 is limited to areas near the corroded carbide eutectics 8 because the carbide eutectics 8 are small in size, and do not have an interconnected branching structure. That is, the corrosion is not a continuous event unlike the corrosion that occurs in a chain reaction along the carbide eutectics in the branching carbide eutectics of the related art. The corrosion and wear resistant overlay 7 of the embodiment can thus have improved corrosion resistance.

Even in applications where the corrosion and wear resistant overlay 7 according to the present embodiment is used in a pipe of a nuclear power plant, because of the improved corrosion resistance of the corrosion and wear resistant overlay 7, the cobalt in the corrosion and wear resistant overlay 7 dissolves into the flowing fluid in the pipe in reduced amounts. There accordingly is less exposure to people working in a nuclear power plant.

The corrosion and wear resistant overlay 7 has been described as being configured from four metal layers 1a, 1b, 1c, and 1d. However, the number of layers constituting the corrosion and wear resistant overlay 7 is not limited to four, and the corrosion and wear resistant overlay 7 may have any number of layers. In an extreme case, the corrosion and wear resistant overlay 7 may have only one layer. However, considering the practical thickness of the corrosion and wear resistant overlay 7, at least about 3 layers would be necessary for the corrosion and wear resistant overlay 7.

In the embodiment above, the laser beam 4 was described as having preset intensities so that the laser beam 4 applied to form the metal layers 1a, 1b, 1c, and 1d has higher intensities for layers closer to the base 2, or lower intensities for layers farther away from the base 2. However, the laser beam 4 is not necessarily limited to this condition. For example, the intensity of the laser beam 4 may be the same for all layers. However, the laser beam 4 applied to form the uppermost layer of the corrosion and wear resistant overlay 7 (metal layer 1d) is adjusted to such an intensity that the size of the carbide eutectics 8 contained in this layer becomes 10 µm or less.

The reason that the intensity of the laser beam 4 applied to form layers of the corrosion and wear resistant overlay 7 is higher for layers closer to the base 2 is to reduce the time needed to form each layer while providing strength for the corrosion and wear resistant overlay 7. To describe more specifically, melting and deposition of the powder 5 discharged through the nozzle 3 takes time when the intensity of the laser beam 4 is weak. That is, it takes time to form the metal layer 1 with a weak laser intensity. In the present embodiment, the layer formation time is reduced by increasing the intensity of the laser beam 4 when forming layers other than the outermost layer because these layers have only a small influence on corrosion resistance.

With an increased intensity of the laser beam 4, the deposit resulting from the melting of the powder 5 cools after the application of sufficient heat, and the dendrites 9 form larger crystals. A larger crystal size of dendrites 9 can provide higher strength, depending on the crystal size.

That is, the corrosion and wear resistant overlay 7 according to the present embodiment can achieve appropriate corrosion resistance and appropriate strength while being formed in a short time period.

In the foregoing First Embodiment, the metal layers 1a, 1b, 1c, and 1d are formed by heating, melting, and depositing the Co-base alloy powder 5 discharged through the nozzle 3, using the laser beam 4, as described with reference to FIG. 1. However, the method of forming the metal layers 1a, 1b, 1c, and 1d is not limited to this. For example, the Co-base alloy powder 5 may be laid (deposited) in advance on the base 2 or on the metal layers 1a, 1b, 1c formed beforehand, and the laser beam 4 may be applied to heat and melt the Co-base alloy powder 5. The means to heat the Co-base alloy powder 5 is not limited to the laser beam 4, and may be, for example, arc discharge, or a charged-particle beam in a vacuum.

Supplementation for First Embodiment

The mechanism by which corrosion occurs on a surface of a Co-base alloy having dendrites 9 of a crystalline structure is known to involve a carbide eutectic 8, which precipitates at the boundaries between crystals of the dendrites 9. A phenomenon in which Cr concentration decreases at the boundaries between dendrites 9 and carbide eutectics 8 is also a known cause of easy detachment of the carbide eutectics 8 from the dendrites 9.

With regard to these facts, the present inventors have confirmed, both empirically and experimentally, that the Cr concentration decrease at the boundaries between dendrites 9 and carbide eutectics 8 hardly occurs under the following conditions. That is, the Cr concentration hardly decreases when the carbide eutectic 8 that has precipitated along the crystal boundary between two dendrites 9 has a thickness of about 10 µm or less, and when the Cr concentration is about 17% or more in the dendrites 9 and in the carbide eutectics 8. It can be said accordingly that, in a Co-base alloy satisfying these conditions, the carbide eutectic 8 does not easily detach itself from the crystalline structure of the dendrites 9, that is, surface corrosion does not easily occur in such a Co-base alloy.

The dendrites 9 and the carbide eutectics 8 can have a Cr concentration of about 17% or more when the Cr concentration in the feedstock Co-base alloy powder 5 is about 17% or more. The carbide eutectics 8 that appear on the surface of the corrosion and wear resistant overlay 7 can have a size or a thickness of at most several micrometers by forming the corrosion and wear resistant overlay 7 with adjusted intensities of the laser beam 4, as described above with reference to FIG. 1.

Considering this, "thickness" is a more accurate representation of the actual conditions of the carbide eutectic 8 than the term "size" used in First Embodiment. In actual practice, the carbide eutectics 8 precipitate along the boundary surfaces between the dendrites 9, and their shape more resemble a film than a granule. Referring to the micrograph of FIG. 1(b), the carbide eutectics 8 probably form a continuous film (not visible at this magnification) around the carbide eutectics 8 appearing granular in shape in the picture, and what appears to be a granular portion of the carbide eutectics 8 can be seen as a thickened part of the film. Accordingly, it is more appropriate to refer the size of carbide eutectics 8 to as a thickness of the film of carbide eutectics 8, as opposed to a diameter of the granule of carbide eutectics 8.

In this case, the corrosion and wear resistant overlay 7 shown in FIG. 2 can be described as having a structural feature that the average thickness of carbide eutectics 8 occurring in each metal layer 1a, 1b, 1c, and 1d is thicker in layers closer to the base 2, or thinner in layers farther away from the base 2. The corrosion and wear resistant overlay 7 does not easily corrode when the carbide eutectics 8 in the surface of the uppermost metal layer 1d has a maximum thickness of about 10 µm or less, and when the dendrites 9 and the carbide eutectics 8 in the metal layer 1d have a Cr concentration of about 17% or more.

Second Embodiment

Figure 4:
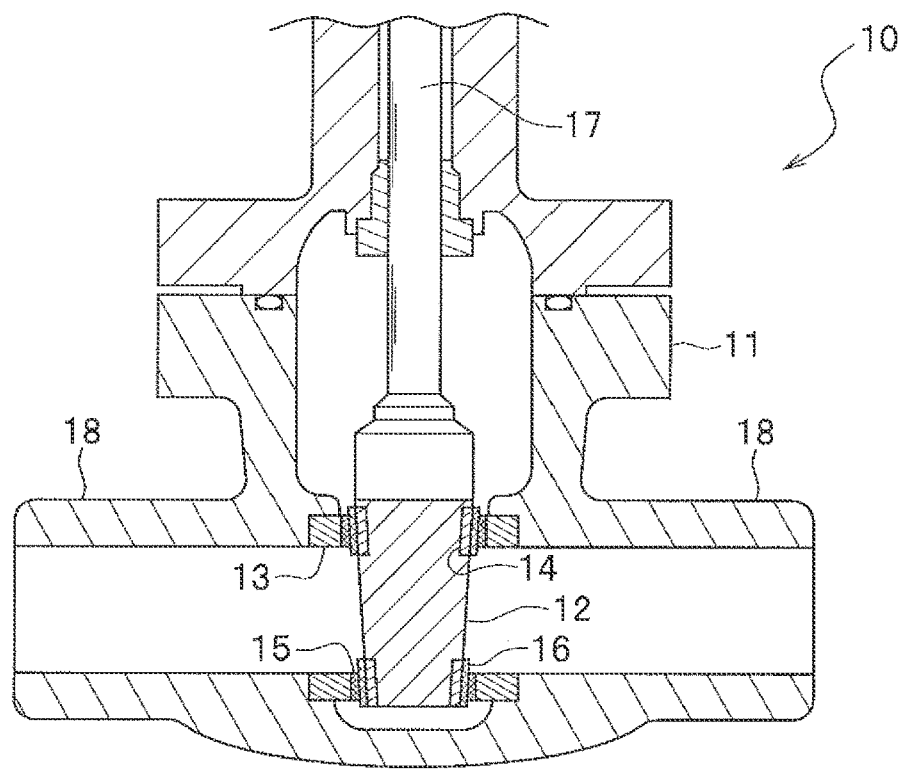
FIG. 4 is a diagram schematically representing an example of a structure of a gate valve according to Second Embodiment of the present invention.
Figure 5:
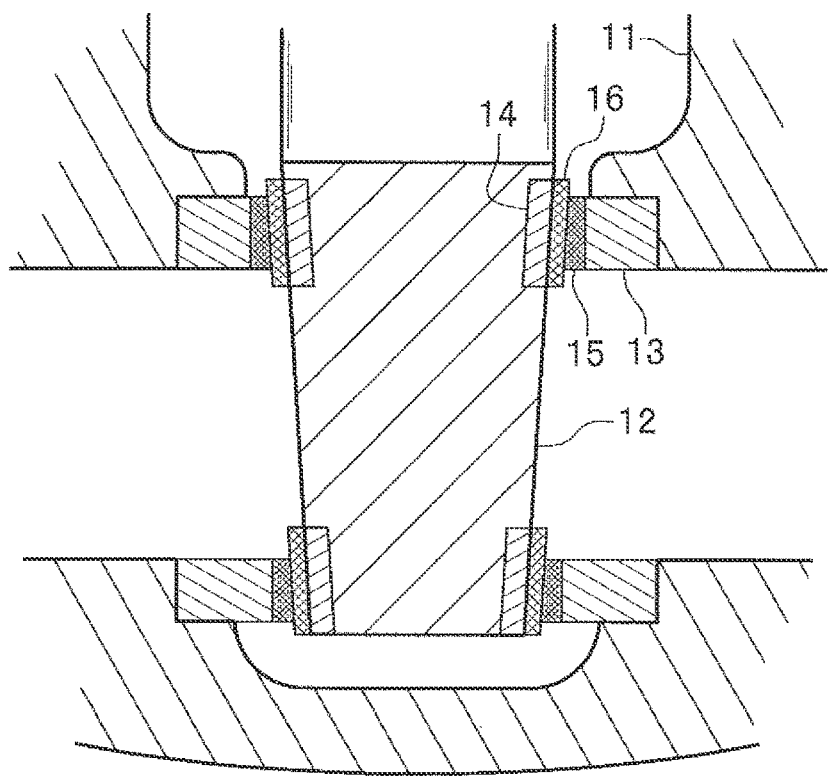
FIG. 5 is a diagram magnifying a valve seat portion of the gate valve shown in FIG. 4.

FIG. 4 is a diagram schematically representing an example of a structure of a gate valve 10 according to Second Embodiment of the present invention. FIG. 5 is a diagram magnifying a valve seat portion of the gate valve 10 shown in FIG. 4. The gate valve 10 is provided in a part of a pipe section 18 provided as a conduit for a fluid. In an open state, the gate valve 10 allows the fluid to flow. In a closed state, the gate valve 10 stops the passage of the fluid.

As illustrated in FIG. 4, the gate valve 10 is configured from a valve casing 11, a valve body 12, a valve stem 17, and the pipe section 18, among other members. The valve body 12 is a disc-like member that closes the pipe section 18 provided as a conduit for a fluid. In a closed state (closed), the valve body 12 sits in the pipe section 18, and stops the passage of the fluid in the pipe section 18. In an open state (open), the valve body 12 is pulled into the valve casing 11 by the valve stem 17, and allows the fluid to flow in the pipe section 18.

In the gate valve 10, the valve body 12 completely closes the pipe section 18 in a closed state. For this purpose, valve seats (a valve body-side valve seat 14, and a valve casing-side valve seat 13) are provided for the valve body 12, and for the pipe section 18 that comes into contact with the valve body 12 and lying beneath the valve casing 11. The valve body-side valve seat 14 and the valve casing-side valve seat 13 come into contact, and press against each other when the gate valve 10 is in a closed state. That is, when opening and closing the valve body 12 of the gate valve 10, the valve body-side valve seat 14 moves or slides against the valve casing-side valve seat 13 in contact therewith.

Co-base alloys with desirable wear resistance and corrosion resistance (e.g., Stellite®) represent a traditional material of choice for the valve body-side valve seat 14 and the valve casing-side valve seat 13. However, the material lacks sufficient corrosion resistance in applications such as a nuclear power plant, as described above. As a countermeasure, in the present embodiment, the corrosion and wear resistant overlay 7 described in First Embodiment is applied to the valve body-side valve seat 14 and the valve casing-side valve seat 13 in portions that come into contact with each other. In the present embodiment, these portions are referred to as valve body-side valve seat overlay 16, and valve casing-side valve seat overlay 15.

Accordingly, the valve body-side valve seat overlay 16 and the valve casing-side valve seat overlay 15 share the same feature and effect as the corrosion and wear resistant overlay 7 according to First Embodiment. That is, in the present embodiment, the valve body-side valve seat overlay 16 and the valve casing-side valve seat overlay 15 of the gate valve 10 have improved corrosion resistance compared to the related art. Accordingly, a pipe of a nuclear power plant provided with the gate valve 10 can have a reduced amount of cobalt that dissolves into the circulating fluid in the pipe. There accordingly is less exposure to people working in such a nuclear power plant.

In the present embodiment, the material in the main part of the valve body-side valve seat 14 and the valve casing-side valve seat 13 (portions excluding the valve body-side valve seat overlay 16 and the valve casing-side valve seat overlay 15) is not necessarily limited to a Co-base alloy, and may be, for example, a carbon steel, or a stainless steel, provided that at least the valve body-side valve seat overlay 16 and the valve casing-side valve seat overlay 15 are the corrosion and wear resistant overlay 7 described in First Embodiment.

Second Embodiment described an application of the corrosion and wear resistant overlay 7 of First Embodiment to the gate valve 10. However, the corrosion and wear resistant overlay 7 described in First Embodiment is not limited to the gate valve 10, and may be applied to, for example, a check valve (not shown in the drawings).

The present invention is not limited to the embodiments and variations described above, and includes many other variations. For example, the foregoing embodiments and variations were described to help illustrate the present invention, and the invention is not necessarily required to include all of the configurations described above. A part of the configuration of a certain embodiment or variation may be replaced with the configuration of some other embodiment or variation. It is also possible to add the configuration of a certain embodiment or variation to the configuration of some other embodiment or variation. It is also possible to add other configuration to a part of the configurations of the embodiments or variations, or delete and/or replace a part of the configurations of the embodiments or variations.

REFERENCE SIGNS LIST 1, 1a, 1b, 1c, and 1d: Metal layer
2: Base
3: Nozzle
4: Laser beam
5: Powder
7: Corrosion and wear resistant overlay
8: Carbide eutectic
9: Dendrite
10: Gate valve (corrosion and wear resistant valve)
11: Valve casing
12: Valve body
13: Valve casing-side valve seat
14: Valve body-side valve seat
15: Valve casing-side valve seat overlay
16: Valve body-side valve seat overlay
17: Valve stem
18: Pipe section

The invention claimed is:

1. A method for producing a valve, wherein the valve comprises:
   a pipe section as a conduit for a fluid;
   a valve body that opens and closes the pipe section;
   a plurality of first valve seats provided in the valve body and a plurality of second valve seats provided in the pipe section in portions that come into contact with each other when the pipe section is closed; and
   a plurality of valve body-side valve seat overlays disposed on an outer surface of the plurality of first valve seats; and a plurality of valve casing-side valve seat overlays disposed on an inner surface of the plurality of second valve seats between the plurality of valve body-side valve seat overlays and the plurality of second valve seats;

wherein the plurality of valve body-side valve seat overlays and the plurality of valve casing-side valve seat overlays come into contact with each other when the pipe section is closed; and wherein each of the plurality of first valve seats, the plurality of second valve seats, the plurality of valve body-side valve seat overlays and the plurality of valve casing-side valve seat overlays is formed by:
- a first step of heating and melting a Co-base alloy powder to form a first Co-base alloy layer on a base; and
- a second step of forming a plurality of other Co-base alloy layers, each of which is formed on a surface of a previously formed Co-base alloy layer starting with the first Co-base alloy layer, by repeating the first step a plurality of times;

wherein an amount of heat input to heat and melt the Co-base alloy powder is reduced each time one of the other Co-base alloy layers is formed in the second step;

wherein the first Co-base alloy layer and each of the other Co-base layers is formed by heating and melting the Co-base alloy powder deposited beforehand;

wherein each of the first Co-base alloy layer and the other Co-base alloy layers is formed such that a carbide eutectic that precipitates at a boundary between crystals of a dendrite structure of a Co-base alloy in at least an outermost Co-base alloy layer has a maximum thickness of 10 µm or less in the first step and the second step; and wherein each of the first Co-base alloy layer and the other Co-base alloy layers is formed by using an arc discharge or a charged-particle beam in a vacuum.

2. The method according to claim 1, wherein the first Co-base alloy layer is formed on a surface of a base comprising a stainless steel.

3. The method according to claim 1, wherein the first Co-base alloy layer is formed on a surface of a base comprising a carbon steel.

* * * * *